Nov. 10, 1970 R. L. ROSENBERG ET AL 3,539,873

MATRIX BOARD APPARATUS

Filed Oct. 19, 1967 4 Sheets-Sheet 1

INVENTORS:
ROGER L. ROSENBERG
ROBERT D. ZIELINSKI
By Mason, Kolehmainen, Rathburn, & Wyss
Attys.

Nov. 10, 1970 R. L. ROSENBERG ET AL 3,539,873

MATRIX BOARD APPARATUS

Filed Oct. 19, 1967 4 Sheets-Sheet 2

INVENTORS:
ROGER L. ROSENBERG
ROBERT D. ZIELINSKI

By Mason, Kolehmainen, Rathburn & Wyss
Attys.

INVENTORS:
ROGER L. ROSENBERG
ROBERT D. ZIELINSKI
By Mason, Kolehmainen, Rathburn & Wyss
Attys.

MATRIX BOARD APPARATUS

Filed Oct. 19, 1967

INVENTORS:
ROGER L. ROSENBERG
ROBERT D. ZIELINSKI
By Mason, Kolehmainen, Rathburn & Wyss
Attys.

United States Patent Office 3,539,873

Patented Nov. 10, 1970

3,539,873

MATRIX BOARD APPARATUS

Roger L. Rosenberg, Arlington Heights, and Robert D. Zielinski, Mount Prospect, Ill., assignors to C. P. Clare & Company, Chicago, Ill., a corporation of Delaware Filed Oct. 19, 1967, Ser. No. 676,465
Int. Cl. H02b 1/04
U.S. Cl. 317—99 6 Claims

ABSTRACT OF THE DISCLOSURE

A pair of main printed circuit boards are mounted in a drawer assembly, and each supports several terminal connectors upon which subsidiary boards are releasably mounted. Input and output conductors are supported on the main board, and each subsidiary board supports all of the crossing points of one input conductor with all of the output conductors. Diodes are connected on the subsidiary boards between selected input and output conductors.

The present invention relates to matrix board apparatus, and has for a primary object the provision of an improved programable board apparatus with which programming changes can be accomplished easily, quickly and conveniently.

Matrix or program boards are used to establish a matrix or group of crossing points of two groups of conductors so that selected interconnections between conductors of the two groups can be made. Such boards are used in various encoding and decoding operations, and for other programming uses. As one example, a matrix board may be used in connection with automatic number identification in a telephone system. In this instance, the board is set up so that when a signal is applied to one input conductor of the board array, as by operation of a line relay associated with a particular subscriber, the board provides a coded output representing the subscriber's telephone number. This is accomplished by interconnecting each particular input conductor with selected output conductors at selected crossing points in accordance with a suitable code.

Known matrix board apparatus customarily includes a board upon which the input and output conductors are arrayed in some fashion so that each input conductor crosses each output conductor. Diodes, resistors or the like are connected at crossing points of selected input and output conductors in accordance with the particular code or program used. However, when it is desired to change the program, even for one input conductor, it may be necessary to disconnect the entire board so that the matrix is disabled.

Accordingly, one object of the present invention is to provide matrix board apparatus with which parts of the program or code can be changed without disturbing the remainder of the matrix.

Another object is to provide matrix board apparatus with which changes can be made easily and quickly, and can be made by skilled personnel at a location other than the board installation.

A more specific object of the invention is to provide an apparatus including a main board together with several detachable subsidiary boards each of which includes all of the crossing points associated with one conductor.

Briefly, in accordance with the above and other objects and advantages of the invention, an embodiment of the invention may include a main board upon which are arrayed first and second groups of conductors which may serve as input and output conductors. In accordance with an important feature of the invention, several detachable subsidiary boards are provided, and each subsidiary board supports all of the crossing points of one input conductor with all of the output conductors. More specifically several terminal connectors, one corresponding to each input conductor, are mounted on the main board and are connected to each output conductor and to one input conductor and a subsidiary board is frictionally and releasably engageable with each terminal connector. Crossing points are provided on each subsidiary board by one conductor coupled to the particular input conductor and a plurality of other conductors coupled in one-to-one relation to the output conductors. Coupling means, such as diodes or the like, are connected on each subsidiary board between the one conductor and selected other conductors thereby to provide coded or programmed connections between the respective input conductor and selected output conductors.

Since the individual subsidiary boards can be detached from the main board, the coded output signal produced by coupling a signal to any particular input conductor may be changed without disconnecting the main board or otherwise affecting the remainder of the matrix. Thus, when it is desired to change a particular program, the respective subsidiary board can be removed at a convenient time and altered at a remote location, or can immediately be replaced with a previously prepared alternate subsidiary board. In addition, the matrix can easily be expanded or reduced simply by adding or removing subsidiary boards.

In the specification and claims of the application the terms "input" and "output" are used in connection with particular groups of conductors and terminals. It is well known to those skilled in this art, however, that the terms "input" and "output" are relative in that they relate to the particular circuit arrangement with which a matrix is used. Accordingly, it should be understood that as used in the specification and claims the terms "input" and "output" are not intended to exclude arrangements wherein the inputs and outputs are reversed.

The above and other objects and advantages of the present invention will appear from the following detailed description of an illustrative embodiment of the invention. Reference is made in the course of this description to the accompanying drawings in which.

Figure 1:
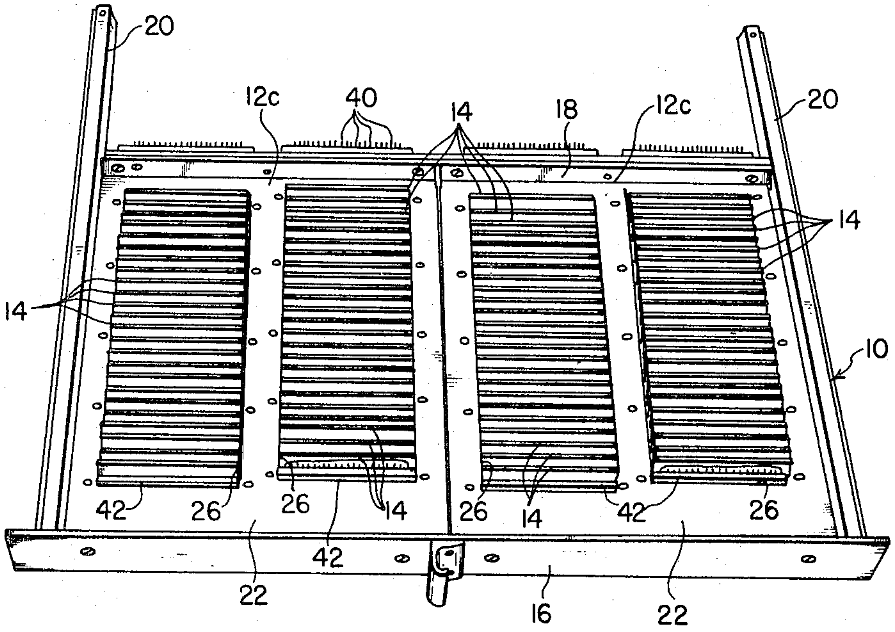
FIG. 1 is a perspective top view of a drawer assembly including matrix board apparatus constructed in accordance with the present invention.
Figure 2:
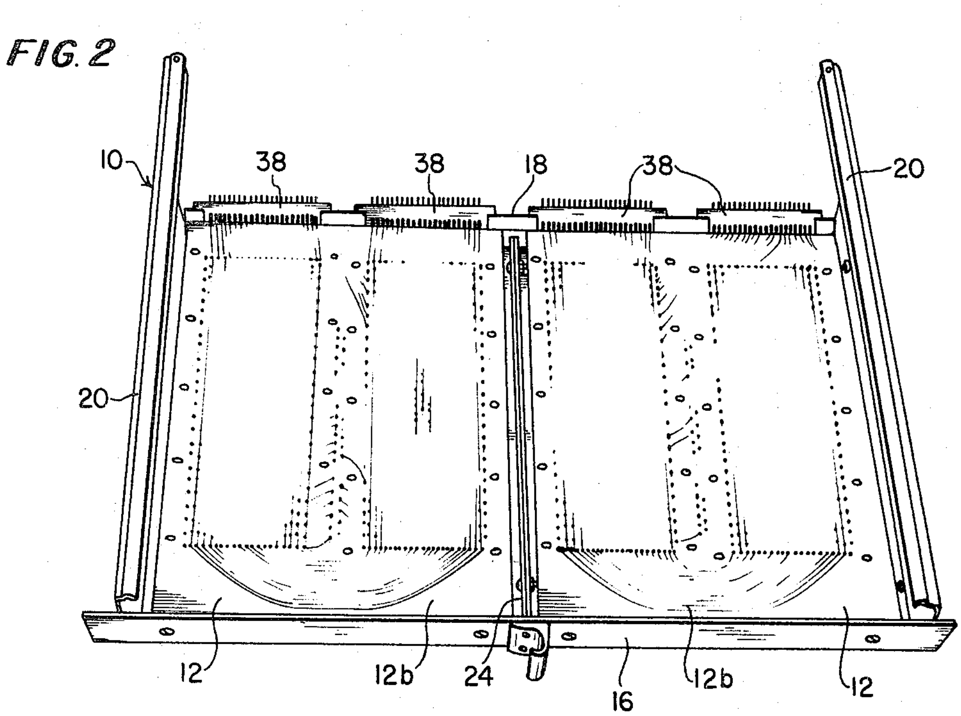
FIG. 2 is a perspective bottom view of the apparatus of FIG. 1.

Referring now to the drawings, and initially to FIGS. 1 and 2, there is illustrated a drawer assembly designated as a whole by the reference numeral 10 and including a pair of similar main boards 12. In accordance with an important feature of the present invention, each main board 12 supports a plurality of detachable subsidiary boards 14 each bearing all of the crossing points associated with a particular conductor of the matrix.

As illustrated in FIGS. 1 and 2, the drawer assembly 10 includes a front panel 16, a rear bracket 18 and a pair of drawer slides 20. A pair of board supporting plates 22 (FIGS. 1 and 5) are supported between a center support 24 (FIG. 2) and the sides of the drawer. The two main boards 12 are mounted beneath the board supporting plates 22 by fasteners 23 (FIG. 5) and generally rectangular areas of the main boards 12 are accessible from the top of the drawer assembly through apertures or openings 26 in the plates. The subsidiary boards 14 are mounted, in a manner described in more detail hereinafter, on the main boards 12 and are accessible through the openings 26.

Mounting of the main boards 12 in the drawer assembly 10 provides a convenient arrangement for storing several of the boards in a small space. As is well known to those skilled in the art, several drawers 10 may be slidably mounted in a cabinet so that each drawer can be moved from its normal, stored position to a position wherein it is easily accessible.

Figure 3:
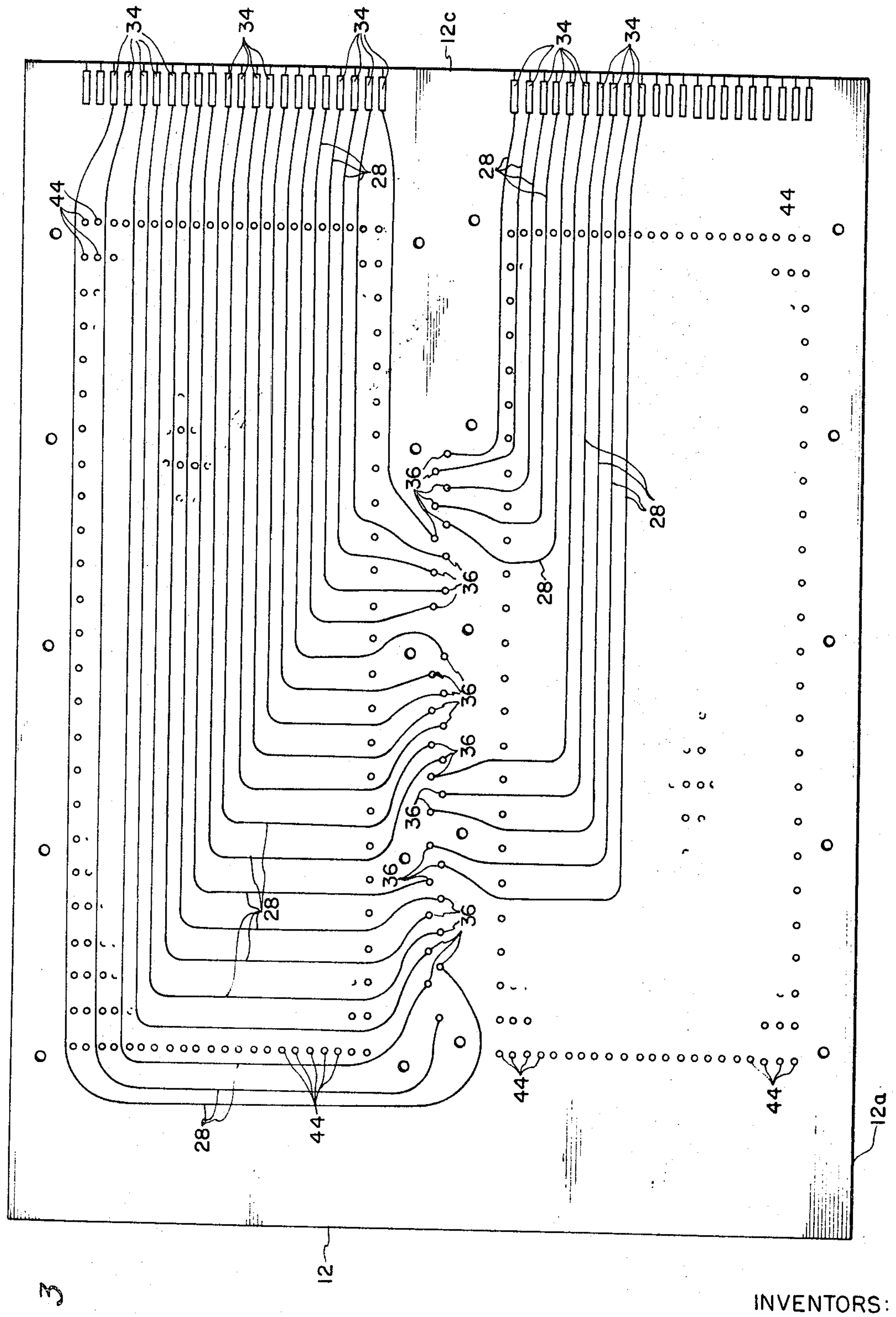
FIG. 3 is a plan view of one of the main boards of the matrix board apparatus of FIG. 1 illustrated prior to mounting of the terminal connectors and prior to mounting of the main board in the drawer assembly.
Figure 4:
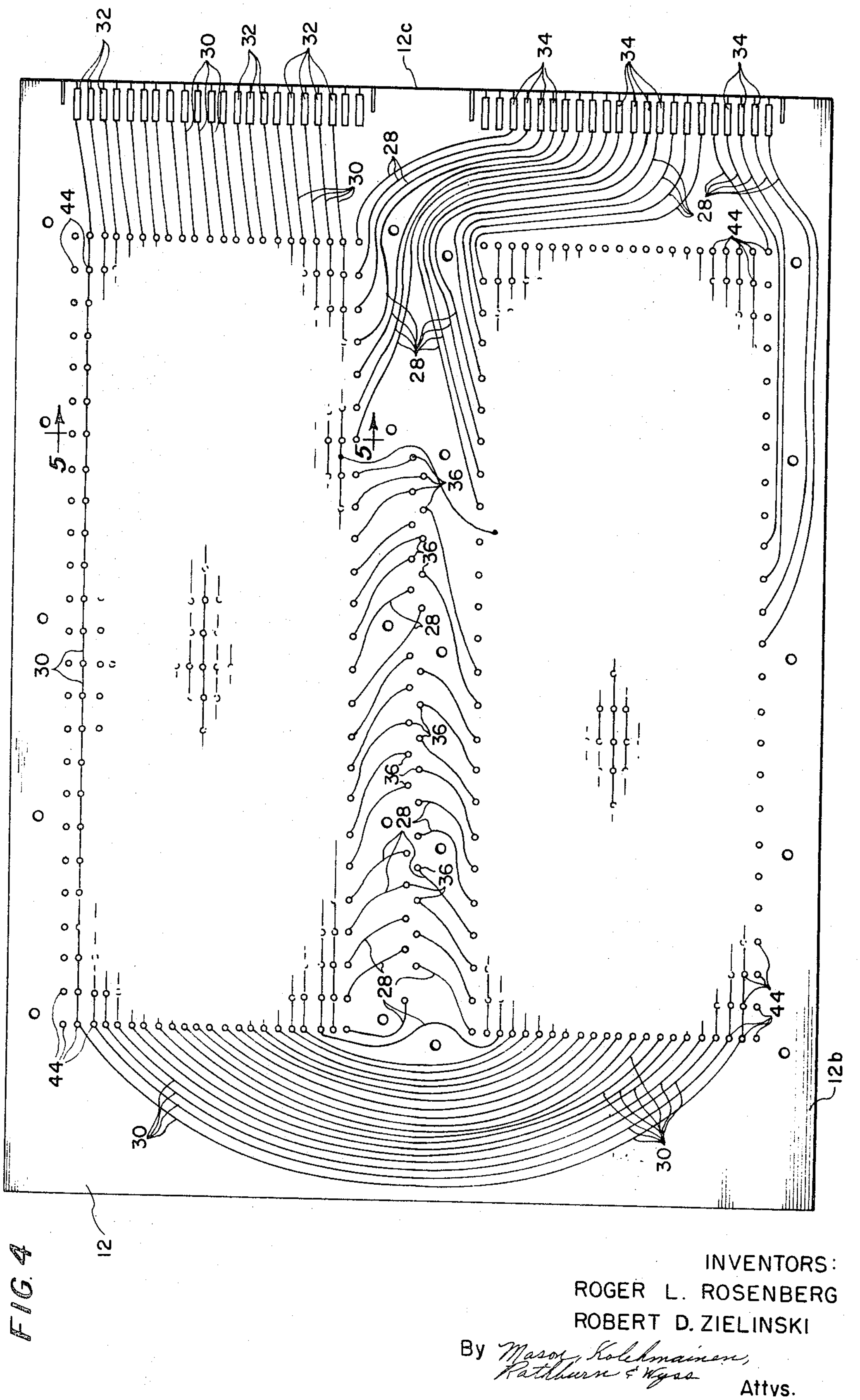
FIG. 4 is a bottom plan view of the apparatus of FIG. 3.

The construction of one of the main boards 12 appears from FIGS. 3 and 4, which figures illustrate respectively the top 12*a* and the bottom 12*b* of one of the boards 12 prior to assembly of the board into the drawer assembly 10 illustrated in FIGS. 1 and 2. Each of the main boards 12 together with its several subsidiary boards 14 establishes a matrix of crossing points between a group of input conductors 28 and a group of output conductors 30. Referring to FIG. 4, the underside 12*b* of the board 12 supports the group of conductors 30, referred to herein as output conductors. Each of the output conductors 30 is discrete from the others and is connected to one of a group of terminals 32 referred to herein as output terminals and disposed on the underside 12*b* of the board near an edge 12*c* thereof. Each of the conductors 30 includes two elongated linear segments, each running most of the length of the board, and the elongated segments of the conductors 30 are parallel to one another so that they form rows running down one half of the board 12 and back on the other half of the board.

The other group of conductors 28, herein termed input conductors, are supported both on the top surface 12*a* and the bottom surface 12*b* of the board. Each of the input conductors 28 is discrete from the others and from the output conductors 30 and is connected to one of a group of terminals 34 herein termed input terminals. Several of the input terminals 34 are disposed on the bottom 12*b* of the board (FIG. 4) and the input conductors 28 connected to these terminals are disposed entirely on the bottom surface 12*b* of the board. Others of the input terminals 34 are disposed on the top 12*a* of the board (FIG. 3) and the input conductors 28 associated with these terminals extend through the board to the underside 12*b* thereof by means of a plurality of lead-through connectors 36.

In the illustrated embodiment of the invention, the conductors 28 and 30 as well as the terminals 32 and 34 are applied to the surface of the board using the technique of printed circuit board construction. The boards 12 may be formed of thermoplastic impregnated paper laminate or the like and the conductors and terminals are in the form of thin, flat metallic layers applied to the surfaces of the board. The boards 12 are mounted in the drawer assembly 10 with the terminal edge 12*c* disposed at the rear, and suitable terminal members 38 including protruding terminals 40 (FIG. 1) are connected to the edges 12*c* of the boards so that the input and output terminals 34 and 32 can be connected to external circuitry by means of flexible cable or the like (not shown).

One important aspect of the present invention resides in the fact that all of the crossing points associated with each of the input conductors 28 are supported on one of the subsidiary boards 14. Accordingly, each board 14 is releasably mounted on one of the main boards 12 and is conductively connected to one input conductor 28 and to all of the output conductors 30 by means of a terminal connector generally designated as 42.

As appears best from FIG. 4, the input conductors 28 terminate adjacent the parallel-disposed linear segments of the output conductors 30 at points evenly spaced along the length of the linear segments. In order mechanically and electrically to connect the terminal connectors 42 to the board 12, a plurality of holes 44 extend through the board 12, and the holes 44 are aligned in rows transverse to the columns of output conductors 30. Each row of holes 44 includes one hole intersecting one of the input conductors 28 as well as holes intersecting each of the output conductors 30.

In order detachably to mount the subsidiary boards 14 on the main board 12, the terminal connectors 42 are mounted on the top surface 12*a* of the board so as to be accessible through the openings 26 in the plates 22. Each terminal connector 42 is mounted over one of the rows of holes 44, and serves to establish releasable conductive connections to one of the input conductors 28 and to all of the output conductors 30.

Figure 5:
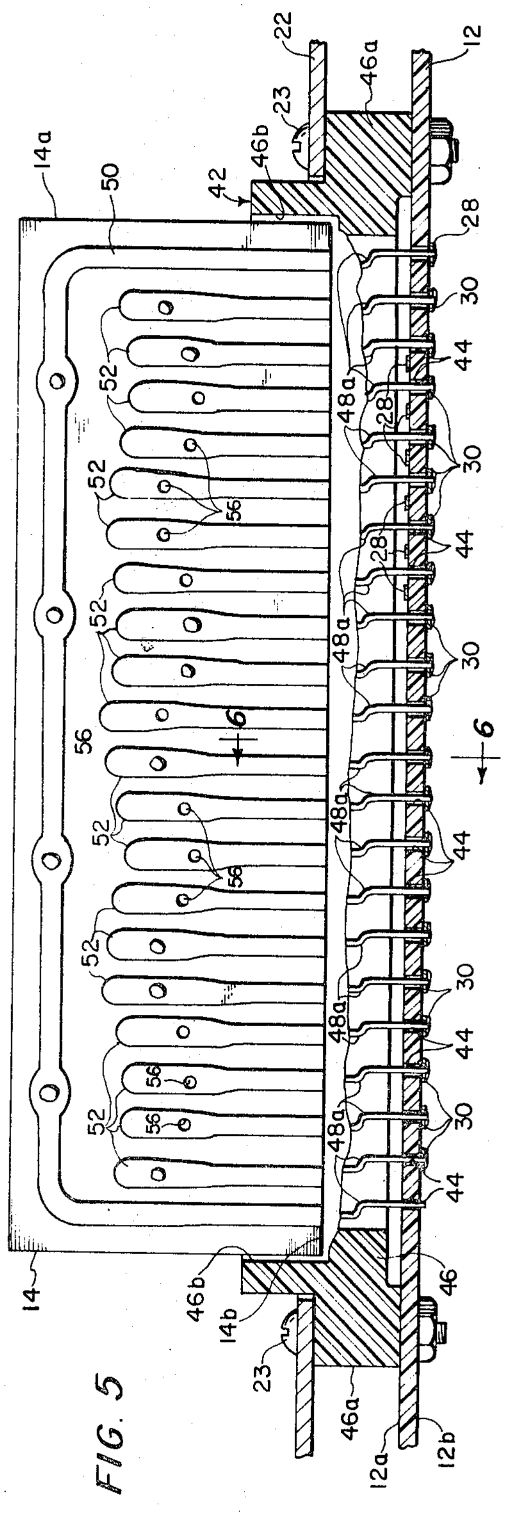
FIG. 5 is a fragmentary sectional view, partly broken away, taken along the line 5—5 of FIG. 4 and illustrating one of the terminal connectors and subsidiary boards.
Figures 6, 7:
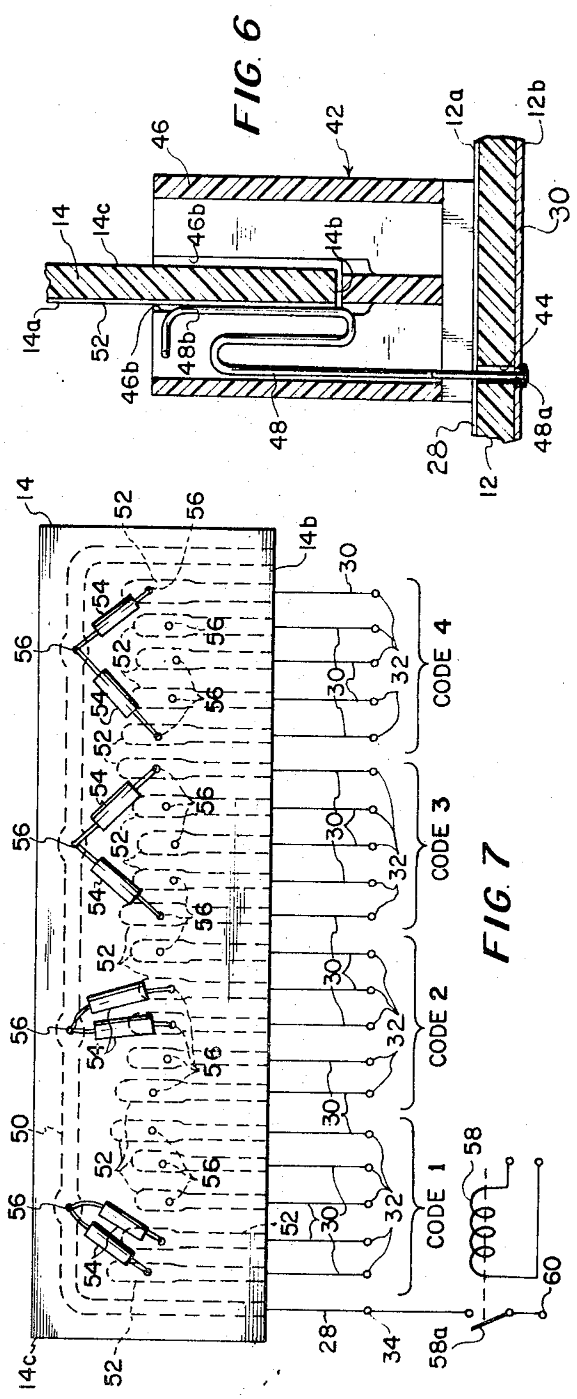
FIG. 6 is a fragmentary sectional view taken along the line 6—6 of FIG. 5.
FIG. 7 is a rear elevational view of the subsidiary board of FIG. 5 in conjunction with a schematic diagram demonstrating the manner in which the apparatus of the invention provides a coded output signal in response to an input signal.

As shown in FIGS. 5 and 6, each terminal connector 42 includes a body 46 formed of insulating material such as molded plastic with a pair of shoulders 46*a* held between a board 12 and a plate 22 by the fasteners 23. A recess within the body of each terminal connector 42 contains several conductive formed wire connector elements 48 (FIG. 6) including downwardly extending legs 48*a* received in the holes 44 of the row associated with the terminal connector 42. The legs 48*a* are conductively bonded beneath the board 12 to one of the input conductors 28 and to all of the output conductors 30 by conventional flow soldering or dip soldering techniques.

In accordance with the invention and as discussed above, all of the crossing points of each input conductor 28 are supported on one of the subsidiary boards 14. As can be seen in FIG. 5, each board includes a first conductor 50 supported on a front surface 14*a* of the board 14 and extending at two points to an edge 14*b* of the board. In addition the board includes several additional conductors 52 extending from the edge 14*b* to points adjacent the conductor 50. As with the board 12, the board 14 can be manufactured with a conventional printed circuit board process.

The terminal connector 42 serves not only to releasably mount the subsidiary board 14 on the main board 12, but also to couple the conductor 50 to one of the input conductors 28 and to couple the conductors 52 to the output conductors 30. Thus the body of terminal connector 42 includes shoulders 46*b* (FIGS. 5 and 6) defining a slot into which the edge 14*b* of the board 14 may be inserted. Resilient contact portions 48*b* (FIG. 6) of the elements 48 frictionally abut against the conductors 50 and 52 thereby to interconnect them with the conductors 28 and 30 when the subsidiary board 14 is slipped into place.

Since all the crossing points of one of the conductors 28 with all of the conductors 30 are located conveniently on one of the boards 14, all selected interconnections are made on the boards 14. As appears in FIG. 7 the desired interconnections are made with diodes 54 mounted on a rear surface 14*c* of the board and having leads extending through holes 56 and soldered to the conductor 50 and selected conductors 52. Obviously, resistors, wires or other coupling elements may be used in place of the diodes.

As noted previously, one use to which the matrix apparatus of the invention may be put is for automatic number identification in telephone systems. Referring now to FIG. 7, one of the boards 14 is illustrated as it might be arranged for this purpose. Thus there is schematically shown a relay including a winding 58 and a set of normally open relay contacts 58*a*. The relay, for example, may be one of a group of line relays, each associated with a particular telephone subscriber, and each associated with one of the input conductors 28. When the subscriber's telephone is placed off-hook, the winding 58 is energized by well known circuitry to close the relay contacts 58*a*. The closure of the contacts 58*a* connects one of the input terminals 34 on the board 12 to a terminal 60 that is connected to a suitable potential source.

In the case illustrated in FIG. 7, several diodes 54 are connected between the conductor 50, which is coupled to the respective input conductor 28 corresponding to the subscriber, and various ones of the conductors 52, which are coupled to the output conductors 30. The connections to the conductors 52 are made so that a coded output signal is provided corresponding to the subscriber's number on the basis of, for instance, a 2 of 5 code. The arrangement illustrated includes twenty conductors 52 and output conductors 30 used to code four digits. The twenty coding conductors 52 are divided into four groups of five adjacent conductors to which are assigned the weights 0, 1, 2, 4, and 7. If the subscriber's number is assumed to be "1677" and if the conductors 52 are assigned the weights 0, 1, 2, 4, and 7 considered from left to right in FIG. 7, the first code digit "1" is coded by diode coupling the energized conductor 50 to the "0" and "1" conductors in the first group of five conductors 52. In a similar manner, the second digit "6" is coded by coupling the conductor 50 through two diodes 54 to the two conductors 52 to which weights "2" and "4" are assigned in the second group of five conductors 52. The digits "7" are coded by diode coupling to the conductors 52 having the assigned weights "0" and "7." The coded signal provided when the relay winding 58 is energized may be forwarded from the terminals 32 to, for instance, suitable toll ticketing equipment or may be stored or used for other purposes. Many other uses for the matrix apparatus of the invention will be apparent to those skilled in the art.

Changes in the program or code of the matrix arrangement are facilitated by the present invention because all of the crossing points associated with one conductor are supported on one removable subsidiary board. In the above example, for instance, if the number assigned to the relay 58 is changed, it may be desirable that the interconnections between the conductors 50 and 52 be changed also. This can be accomplished simply by removing the respective board 14 and changing the diode coupling, or by replacing the board 14 immediately with another pre-prepared board. It is not necessary to interfere with or disable the rest of the matrix circuitry while making such a change.

While the present invention has been illustrated and described in connection with details of a specific embodiment thereof, it should be understood that various modifications and embodiments can be devised by those skilled in the art. It is intended to cover all such alternatives and embodiments of the invention which fall within the scope of the appended claims.

What is claimed as new and desired to be secured by Letters Patent of the United States is:

1. Apparatus defining a conductive programmable matrix array for use with selectively positioned electrical coupling elements for encoding and decoding or the like, said apparatus comprising a main circuit board supporting a group of first conductors and a group of second conductors, a plurality of connector means on said board each coupled to one of said first conductors and to all of said second conductors, a subsidiary board mounted on each said connector means, each subsidiary board including a single third conductor coupled to the corresponding one first conductor, each said subsidiary board also including a group of fourth conductors coupled in one-to-one relation to said second conductors, and means operatively associated with each said subsidiary board for supporting the electrical coupling elements connected between the third conductor and selected fourth conductors for permitting the establishment of selected interconnections between the first and second conductors.

2. The apparatus of claim 1, said connector means including means for detachably mounting said subsidiary boards on said main boards.

3. The apparatus of claim 2, said mounting means including flexible conductive contactors engageable with said third and fourth conductors.

4. Matrix apparatus for use with selectively positioned electrical coupling elements and comprising:
- a main board formed of insulating material;
- first and second electrically isolated groups of input and output conductors supported on said main board;
- a plurality of subsidiary boards formed of insulating material, each associated with one of said first group of conductors;
- each subsidiary board including a first conductor and a plurality of second conductors supported on the surface of said subsidiary board;
- means for mounting said subsidiary boards on said main board;
- said mounting means including connecting means for connecting said first conductor of each subsidiary board to one of said first group of conductors and for connecting each second conductor of each subsidiary board to one of said second group of conductors;
- and means on each said subsidiary board for supporting the electrical coupling elements between the first conductor and selected second conductors thereby selectively to program desired interconnections between input and output conductors;
- said second group of conductors including segments arranged in parallel on the surface of said main board, and said first group of conductors terminating at points spaced along said parallel-arranged segments;
- said mounting means including terminal connectors mounted on the main board surface transverse to said parallel-arranged segments and each overlying all said second group of conductors and one of said first group of conductors.

5. The matrix apparatus of claim 4, said terminal connectors each including a plurality of connector elements conductively coupled to said second group of conductors and to said one conductor of said first group.

6. The matrix apparatus of claim 5, said subsidiary boards including an edge releasably receivable in said terminal connectors, said first and second conductors including portions extending to said edge to be engaged by said connector elements.

References Cited

UNITED STATES PATENTS

| | | | |
|---|---|---|---|
| 2,799,837 | 7/1957 | Powell. | |
| 3,267,407 | 8/1966 | Humphries et al. | 339—17 X |
| 3,281,627 | 10/1966 | Fetterolf et al. | |
| 3,290,558 | 12/1966 | Sapy. | |
| 3,300,686 | 1/1967 | Johnson. | |

LEWIS H. MYERS, Primary Examiner

D. A. TONE, Assistant Examiner

U.S. Cl. X.R.

317—101